Sept. 22, 1970 I. L. CORELL ET AL 3,530,239

INFORMATION ENCODING AND RECORDING SYSTEM

Filed Jan. 17, 1968

3 Sheets-Sheet 1

INFORMATION ENCODING AND RECORDING SYSTEM

Filed Jan. 17, 1968

3 Sheets-Sheet 3

3,530,239

INFORMATION ENCODING AND RECORDING SYSTEM

Ira L. Corell and Jack Turchon, Bellmore, N.Y., assignors to Jara Electronics, Incorporated, Bellmore, N.Y., a corporation of New York Filed Jan. 17, 1968, Ser. No. 698,647
Int. Cl. H04l 15/06
U.S. Cl. 178—17 13 Claims

ABSTRACT OF THE DISCLOSURE

A keyboard operated information encoding and recording system for preparation of a record adapted for use in graphic arts composition computers in which expanded information handling capacity is provided by a keyboard complex which includes a first set of keys, a second set of keys having variable identity and control keys which designate the second set of keys to have one identity at any given time and which may indicate a printing characteristic for characters represented by said first and second sets of keys. A signal generator is responsive to the operation of the keyboard complex to provide distinct electrical signals which identify each key in the complex. A recorder receives and records the signals to produce an intelligence bearing record indicative of the informational variants entered in the keyboard complex and the printing characteristics therefor.

BACKGROUND OF THE INVENTION

Field of the invention

This invention relates to a system for encoding and recording information. More particularly, the present invention relates to a keyboard operated system with extensive information handling capacity which produces an intelligence-bearing record for use as an input to a computer. One embodiment of the system is designed specifically to handle the full capacity of variants required in graphic arts composition of printed matter.

Description of the prior art

Keyboard systems for encoding and recording information typically include a signal generator operative in response to keyboard entries to produce distinguishable electrical signals and a recorder which receives and records the signals. The resulting record contains intelligence in each recordation frame which is selectively decoded by a computer or other utilization apparatus to identify the keyboard entry. In known systems, wherein the information variants are the alphabetic and numeric characters, a keyboard equivalent to that of a standard typewriter is employed. The signal generator produces a distinct electrical signal in the form of a group of electrical pulses as each key is operated. Typically, a recorder having six information positions or bits is used, thus providing a recordation capacity of $2^6$ or sixty-four keyboard entries. The keyboarding capacity of the known systems, where it is desired to enter character information in a single recordation frame, is then sixty-four keys, which may include the twenty-six upper and twenty-six lower case characters, the ten numerals and two other entries.

Significantly more than sixty-four variants are involved in the typical information pattern. In the graphic arts, for example, the variants may reach twenty thousand. These variants reside ultimately in numerous fonts contained in typesetting or photocomposing machines, and are called from their residences by controlling computers. The fonts may contain, for instance, sets of alphabetic characters in different printing sizes, in different type faces, etc. Other fonts may contain sets of scientific symbols, such as mathematical or chemical symbols and the like. Still other fonts may contain sets of characters of foreign languages. In the face of this magnitude of variant information, character selection by the operation of a single key of a standard typewriter keyboard is impossible. In order to provide the computer with input information to select one of the twenty thousand variants, it has been necessary in the graphic arts for a skilled person to undertake a preliminary step of encoding the manuscript by entering a coded succession of standard characters preceded and followed by a delimiter whenever a non-standard character, type-face change or size change occurs in the manuscript. As many as seven manuscript notations may be involved in entering such a coded succession for a single non-standard character. In keyboarding the character, an operator enters each element in the coded succession by a single keystroke. A high likelihood of error is inherent in the multiple operations of the person encoding the manuscript and the keyboard operator. The resulting record contains the information in seven successive recordation frames. When this record is utilized, reading time at the computer input is unavoidably multiplied by a factor of seven.

The problem is further enlarged by the improved functional capacity of present day computers. Previously computers available for graphic art control included only the simple functions of word hyphenation and line justification. These functions are independent of external stimulus, being operative at all times during the reading of input records. The present day computer, on the other hand, can function to tabulate, alphabetize, store, rearrange, etc. These functions are initiated only in response to input commands, such commands constituting further variants requiring manuscript encoding.

These shortcomings of known systems, i.e., extensive manuscript encoding, multiple keyboard operations for single information entries, high likelihood of operator error, and increased computer input reading time, could be overcome by expanded recordation frame bit capacity. A tape having fifteen bits in each frame would provide capacity for entering $2^{15}$ or over twenty thousand distinct variants. This solution is impractical by reason of commercial limitations, the maximum bit capacity per recordation frame being eight bits in presently available or proposed recording equipment compatible with computers. Furthermore, the keyboarding problem would remain. A keyboard having capacity for single stroke entry of the variants would include an entirely impractical number of keys.

SUMMARY OF THE INVENTION

In the information recording system of the present invention, a keyboard complex has been devised to overcome these shortcomings of the prior art. Encoding of the information prior to keyboarding to accommodate entry of numerous variants is reduced to the mere designation of the category of non-standard information. A maximum of two keystrokes are required to enter any variant, thereby reducing operator time and likelihood of keyboard error. At most, two recordation frames provide indication of variant identity, thereby minimizing the input time involved in utilization equipment reading of recorded variants.

The invention is a system for encoding and recording information consisting of a large variety of separate character and functional elements. The term "character" is here defined as an element of intelligence such as a letter of an alphabet, a punctuation mark, a number, a mathematical symbol, a chemical symbol, a date, an arbitrarily assigned symbol or the like. Characters may be standard such as those which appear on a standard typewriter, or non-standard which would include all others. The term "function" is a command or instruction that may relate to the nature of a character to be printed. For example, the selection of a particular type face, or type size, or the fact that a foreign alphabet or mathematical symbol is desired (as distinguished from the symbol itself which is a character) are all examples of functions. The keyboard complex of the invention contains a character section and a function section. Included in the character section is a variable identity keyboard adapted to represent $n$ distinct sets of character elements. A set may be, for example, a group of mathematical symbols, or the Greek alphabet, or any arbitrarily assigned elements of intelligence. Thus, the variable identity keyboard would have a plurality of keys each of which is representative of a character element in each of the $n$ sets. The function section has a keyboard with at least $n$ keys, each of which is representative of a functional element. The $n$ functional element keys constitute commands directing the variable identity keyboard to represent one of the $n$ sets. Connected to the keyboard complex is a signal generator which produces a distinct electrical signal output upon the operation of each key of the complex. The signals are then furnished to a recorder which records the signals and prepares an intelligence bearing record comprising functional element recordations each being indicative of one of said $n$ functional elements, and character element recordations, each independently indicative of one character element in each of the $n$ sets of character elements. The recordation is rendered indicative of the character element in a particular one of said $n$ sets by the last preceding functional element recordation.

The character section of the keyboard complex may also include a fixed set of characters which may be those most commonly employed, such as for example, the standard characters on a conventional typewriter.

In the preferred embodiment of the invention wherein it is applied to the graphic arts, the keyboard complex includes in addition to the function keyboard described above containing command keys, second and third function keyboards, the keys of which represent size and instructional variants respectively. Operation of such keys provide single recordation frames indicative of these variants. In this embodiment, a logic encoder is operatively responsive to signal generator outputs to modify signals generated by operation of first and second character keyboard keys where one of the two key symbols, e.g., lower and upper case, is demanded.

It is an object of the present invention to provide a keyboard operated recording system in which an increased number of informational variants may be recorded during a given period of keyboard operation.

It is an additional object of the present invention to provide a keyboard operated recording system in which informational variants may be keyboarded without the need for extensive and skillful manuscript encoding before keyboarding.

It is a further object of the present invention to provide a keyboard operated recording system in which informational variants are keyboarded by a reduced number of keystrokes.

It is an object of the present invention to provide a keyboard operated recording system in which the complete identity of any one informational variant is recorded in a reduced number of recordation frames.

It is an additional object of the present invention to provide a keyboard operated recording system in which the frequency of operator error is minimized.

It is a further object of the present invention to provide a keyboard operated recording system including an improved keyboard complex having keys the identity of which is variable.

It is an object of the present invention to provide a keyboard operated recording system including an improved keyboard complex having variable identity keys, the identity of which is designated by previously operated keys.

It is an object of the invention to prepare recordings suitable for use in computer-controlled graphic arts composing machines by a recording system having a keyboard complex of simple, compact design, requiring less skillful manuscript encoding prior to keyboarding and fewer keystroke operations than presently available systems.

It is a further object of the present invention to prepare a graphic arts recordation having increased compatibility with present day graphic arts computing machines.

The following and other objects, features and advantages of the invention will be apparent from the following more particular description of preferred embodiments of the invention which are illustrated in the accompanying drawings wherein like numerals identify similar parts throughout.

DESCRIPTION OF THE PREFERRED EMBODIMENTS

Figure 1:
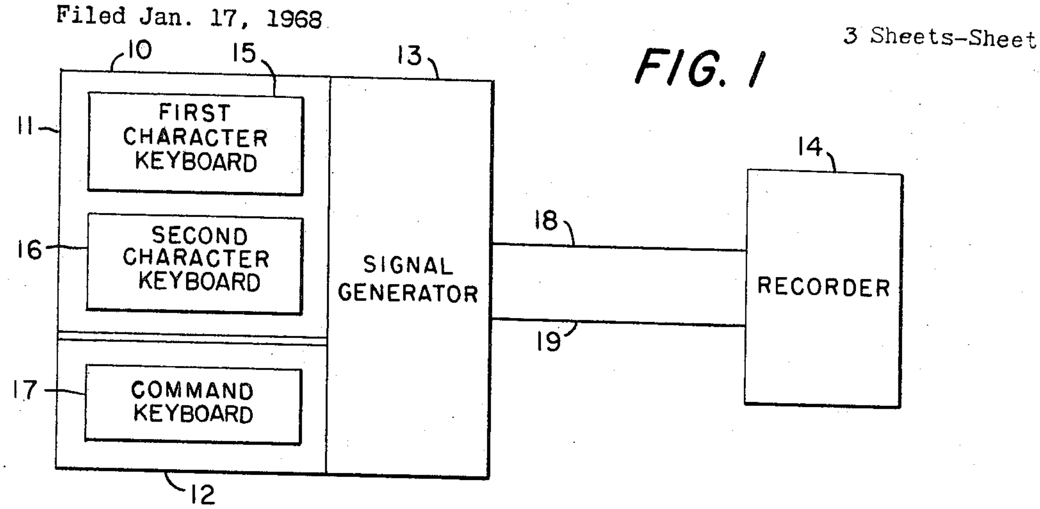
FIG. 1 is a block diagram of the system of the invention.

In FIG. 1 there is shown a block diagram of the present invention. The data encoding and recording system comprises a keyboard complex 10 including a character section 11 and a function section 12, a signal generator 13 and a recorder 14. Character section 11 includes a first keyboard 15, the keys of which represent a specific and fixed set of characters, such as, for example, the letters of the alphabet, the ordinate numerals, punctuation marks and other symbols which are found on a conventional typewriter keyboard. The second keyboard 16 of character section 11 contains a set of keys which have no fixed identification, but can represent different sets of characters. For example, at different times this set of keys may represent the letters of a foreign alphabet, such as that of the Greek or Russian language, or a set of mathematical symbols, chemical symbols, or the like. The function section 12 comprises a single keyboard, command keyboard 17. Keyboard 17 comprises a plurality of keys, each representing a specific command which designates that the keyboard 16 take on a specific one of its several identities. The capacity of keyboard 16 to represent different sets of characters is determined by the number of keys on keyboard 17. If keyboard 17 has $n$ keys, keyboard 16 may represent $n$ different sets of characters. A specific key of keyboard 16 will represent one character in each of the $n$ sets.

Signal generator 13 is actuated by operation of each key in keyboard complex 10 and provides at its output 18 a distinct electrical signal representing the operated key. To this effect, generator 13 may comprise a plurality of switches, each providing a different ouptut signal when actuated by its associated key. Alternatively, switches providing a common electrical pulse pattern at its output terminals may be employed, selective connections being made to the terminals of the switches associated with each key. At signal generator output 19, a record signal is generated in response to the operation of each key. This signal serves both to gate the signals present at output 18 into the recording channels and, following recordation, to incrementally advance recorder 14 for reception of the next signal.

Recordations on the tape produced by recorder 14, while always independently indicative of the key operated, are at times not independently indicative of the demand of the keyboard operator since certain keys have variable identity. In the case of recordations made in response to operations of the keys of first character keyboard 15 and of command keyboard 17, such recordations are indicative of the operator demand independently of any other recordation. In the case of recordation resulting from operation of the keys of second character keyboard 16, the character demand is indicated by (1) the resulting recordation and (2) the last preceding recordation resulting from operation of a key of command keyboard 17. For example, if the operator demand is for the seventh character in the $n$–2 set, the $n$–2 key of command keyboard 17 is operated and then the seventh key of second character keyboard 16 is operated. Two recordations result, the first of which independently indicates command $n$–2 and the second of which independently indicates no particular character identity. Taken in combination, the two recordations indicate the particular character identity. If subsequent recordations resulting from operation of the keys of the second character keyboard 16 occur, in the absence of an intervening different command recordation, these recordations indicate other characters in the $n$–2 set.

The record produced by recorder 14 may be simply interpreted in this manner by a computer programmed in accordance with these instructions pertaining to character identity of recordations.

The first character keyboard 15 may take the form of a conventional typewriter keyboard. In such keyboards, each key typically represents two symbols, a lower and an upper case character. In the simplified form of the system described previously, and in the preferred embodiment of the system to be discussed in detail hereinafter, each key of the complex generates a distinct electrical pulse group. Thus, the system must include means for distinguishing whether the character demand is for the lower or upper case symbol of the operated key of keyboard 15. A system for accomplishing this distinction is illustrated in FIG. 2.

Figure 2:
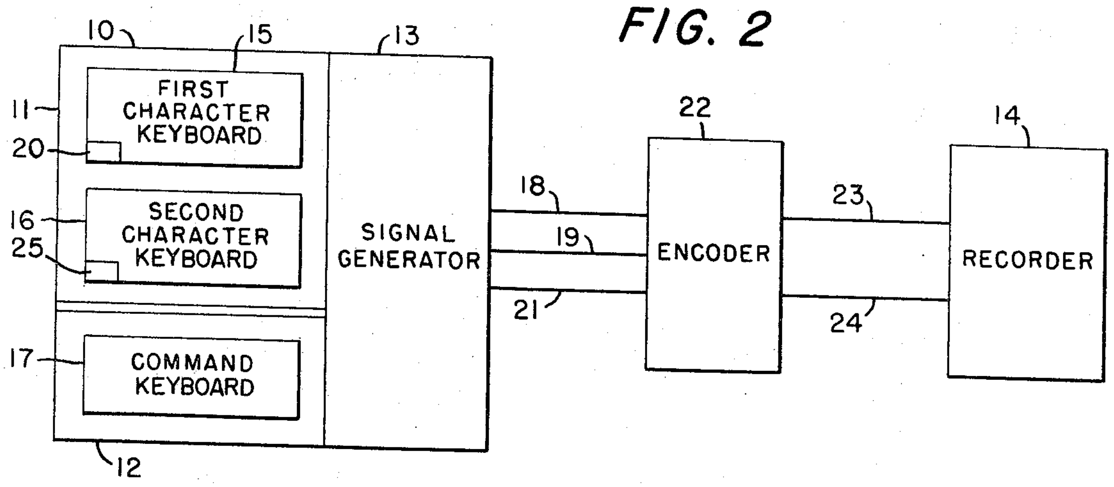
FIG. 2 is a block diagram of a modified form of the system of FIG. 1.

In the system of FIG. 2, first character keyboard 15 includes an upper case key 20 which is operated with a key of the keyboard when an upper case symbol is demanded. The signal generator 13 includes an additional output 21 at which an electrical signal is generated when key 20 is operated. The signal generator outputs 18, 19 and 21, are applied to an encoder 22, which has outputs 23 and 24 connected to recorder 14. Encoder 22 comprises a logic circuit which is operative in responsive to output 21 of generator 13 to modify the electrical pulse group then present at generator output 18 to provide a modified electrical pulse group output at encoder output 24. If the electrical pulse group appearing at output 18 is, for example, an 8-bit pulse group, the encoder logic circuit may insert a bit in one of the eight-bit positions to provide at the output 24 a pulse group which indicates that an upper case symbol of character keyboard 15 is demanded. Generator output 19, which is the RECORD signal, remains unchanged in its passage through encoder 22 and appears at encoder output 23 to initiate a RECORD operation in recorder 14 as discussed above. In those cases in which key 20 is not operated, i.e., all character demands other than first character keyboard 15 upper case symbol, the electrical pulse group generated at generator terminal 19 is unaffected in its passage through encoder 22 since no actuating signal appears at output 21 to initiate encoder logic circuit modification of the electrical pulse group. In the operation of the system of FIG. 2, recordations appearing on the record prepared by recorder 14, are (1) independently indicative of a character demand constituting an upper case symbol of keyboard 15, (2) independently indicative of a character demand constituting a lower case symbol of character keyboard 15, (3) independently indicative of the entry of a command at keyboard 17, and (4) indicative of a character demand constituting a character in a particular one of the $n$ sets of characters represented by character keyboard 16, the particular set being identified by the preceding recordation constituting a demand from keyboard 17.

A similar provision may be employed in the second character keyboard 16 for upper and lower case symbols. To this extent, upper case key 25 is added to keyboard 16, and encoder 22 includes a further logic circuit responsive to operation of key 25 to modify the electrical pulse groups generated in response to concurrent operation of the keys of keyboard 16. Such pulse groups are modified to provide distinction between upper and lower case symbols in each of the $n$ sets of characters represented by keyboard 16.

The system of the invention lends itself to use generally in applications where it is desired to enter a maximum number of variants in a given record volume from a simple keyboard. Typical of such an application is that of the graphic arts where computer controlled printing machines have a most extensive capacity of individual characters in numerous different fonts. If a given photocomposer has one thousand variants of characters, the computer must thus be informed on a character selection basis of one in one thousand. In the present invention, such a selection basis is provided by a tape recording which has in each recordation frame, for example, eight information bits and variable identity provisions. The invention may of course be practiced with recorders having recordation frames of any number of recordation bits. Eight bits will provide in each frame $2^8$ or 256 distinct entries. These entries permit the use of 256 keys in the keyboard complex, and in the absence of the variable identity feature of the invention, this would constitute insufficient identifying capacity to provide a character selection basis of one in one thousand. In the present invention $x$ of these entries, where $x$ is the number of keys in the second character keyboard, have $n$ identities, where $n$ is the number of keys in the command keyboard. Thus, $x$ multiplied by $n$ additional character selection are incorporated in the tape recording. If $x$ is 50 and $n$ is 20, one thousand character selections are incorporated in the tape recording. By this expedient, a character selection basis of one in approximately twelve hundred is provided.

The computer controlled printing machines have in addition to numerous different character fonts, other capacities in which these characters may be produced in any one of a number of type faces. For example, the standard alphabetic and numeric characters represented by the keys of the first character keyboard 15 may be produced in Roman, italics, boldface, etc. The same is true for the $n$ sets of characters represented by the keys of the second character keyboard 16. If there are $m$ keys in the keyboard 15 and $x$ keys in keyboard 16 and $p$ of the $n$ keys are allocated to type face variants, the sum of $m$ and $x$, multiplied by $p$, additional character selections may be incorporated in the tape recording.

Such printing machines have other capacities in which characters may be produced in a number of different sizes. If $q$ command keyboard keys are allocated as size designating keys, the sum of $m$ plus $x$ multiplied by $q$ provide additional character selections. By the inclusion of command keys designating variable character identification, type face and size in the preferred description of the invention which follows, a character selection basis in the order of one in twenty thousand is provided. Thus, the invention provides a machine which enables the efficient use of the full capacity of printing apparatus available to the printing industry.

Present day computers controlling printing machines have, in addition to character selection capacity, certain functional characteristics including, for example, hyphenation, line justification, tabulation, alphabetization, etc. Hyphenation and line justification are performed by these computers without external stimulus. The remaining functions, however, require computer input commands. The command keyboard of the preferred embodiment of this invention includes instructional keys which are allocated to command the computer to perform these functions. Thus, utilizing 256 keys in the keyboard complex where an eight-bit tape is employed, these instructional keys can be included in the keyboard complex without sacrificing the character selection basis of the system by reason of the variable identity feature of the system.

Figure 3:
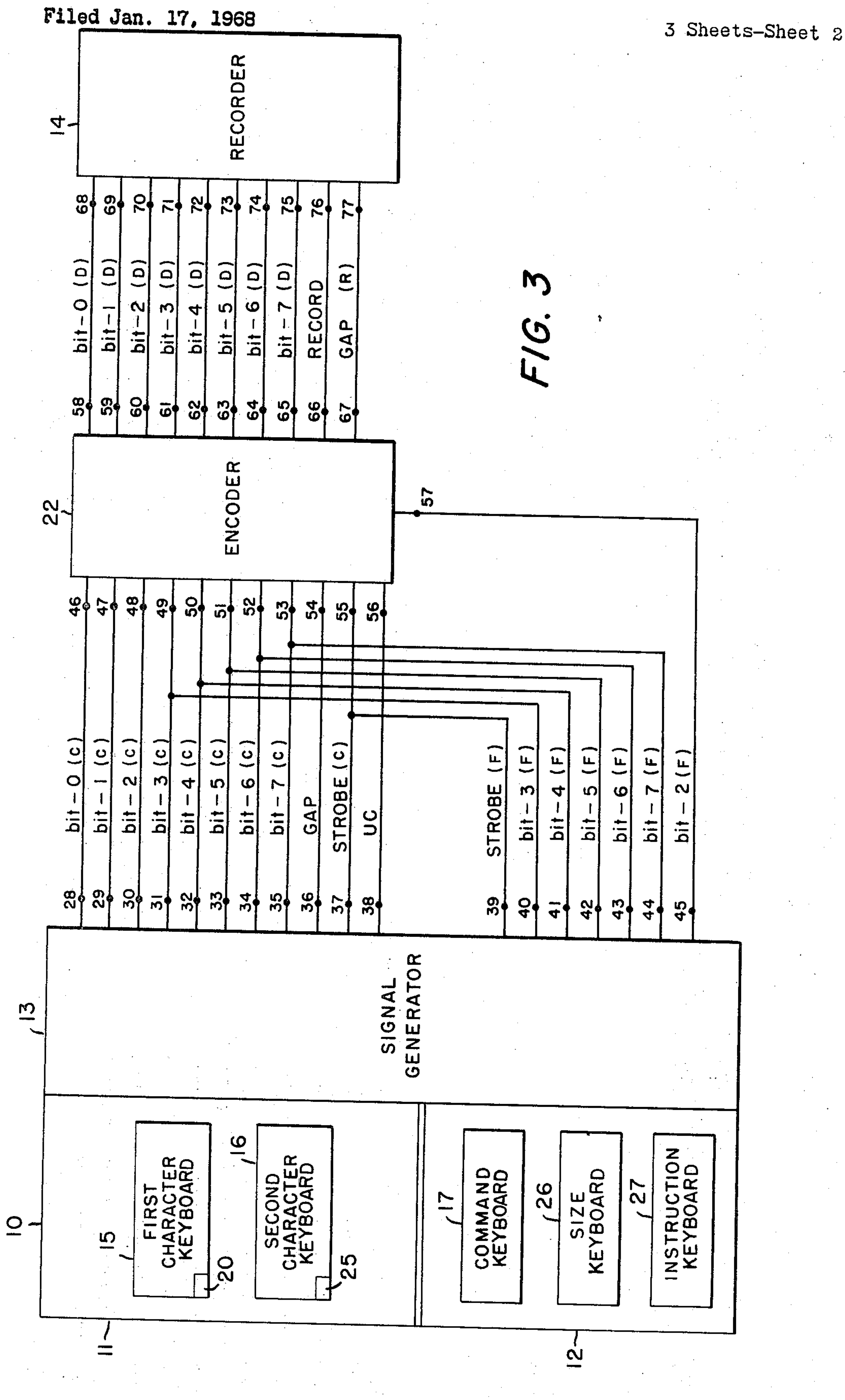
FIG. 3 is a block diagram of the system of the invention as applied to the graphic arts.

In the system of FIG. 3, the character section 11 of keyboard complex 10 comprises first and second character keyboards 15 and 16 discussed above, both of which include upper case keys 20 and 25 respectively. Referring to Tables 1–3, the lower and upper case symbols are identified for each key. However, a single eight-bit code, bit–0 through bit–7, is assigned to the key representing both symbols. First character keyboard 15 comprises the standard typewriter keys, 15–0 through 15–45, forty-six in number, representing eighty-eight different symbols. Second character keyboard 16 comprises fifty character keys. These keys, numbered 16–0 through 16–49, are listed with the eight-bit code assigned thereto in Tables 1, 2 and 3, each key representing a lower case (L) and an upper case (U) symbol. At the direction of the operator, keyboard section 16 may be assigned to any one of a number of different sets of characters, e.g., the Greek alphabet, mathematical symbols, the Russian alphabet, chemical symbols, etc.

CHARACTER KEYBOARDS.—TABLE 1

| Key Number | Lower case symbol | Upper case symbol[1] | Assigned code Bit-0 | -1[1] | -2 | -3 | -4 | -5 | -6 | -7 |
|---|---|---|---|---|---|---|---|---|---|---|
| 15-0 | / | ? | X | | | | | | | |
| 15-1 | a | A | X | | | | | | | X |
| 15-2 | b | B | X | | | | | | X | |
| 15-3 | c | C | X | | | | | | X | X |
| 15-4 | d | D | X | | | | | X | | |
| 15-5 | e | E | X | | | | | X | | X |
| 15-6 | f | F | X | | | | | X | X | |
| 15-7 | g | G | X | | | | | X | X | X |
| 15-8 | h | H | X | | | | X | | | |
| 15-9 | i | I | X | | | | X | | | X |
| 15-10 | ¢ | ° | X | | | | X | | X | |
| 16-34 | 34L | 34U | X | | | | X | | X | X |
| 16-38 | 38L | 38U | X | | | | X | X | | |
| 16-42 | 42L | 42U | X | | | | X | X | | X |
| 16-46 | 46L | 46U | X | | | | X | X | X | |
| 15-11 | Space | | X | | | | X | X | X | X |
| 15-12 | ; | : | X | | | X | | | | |
| 15-13 | j | J | X | | | X | | | | X |
| 15-14 | k | K | X | | | X | | | X | |
| 15-15 | l | L | X | | | X | | | X | X |
| 15-16 | m | M | X | | | X | | X | | |
| 15-17 | n | N | X | | | X | | X | | X |
| 15-18 | o | O | X | | | X | | X | X | |
| 15-19 | p | P | X | | | X | | X | X | X |
| 15-20 | q | Q | X | | | X | X | | | |
| 15-21 | r | R | X | | | X | X | | | X |
| 15-22 | ½ | ¼ | X | | | X | X | | X | |
| 16-35 | 35L | 35U | X | | | X | X | | X | X |
| 16-39 | 39L | 39U | X | | | X | X | X | | |
| 16-43 | 43L | 43U | X | | | X | X | X | | X |
| 16-47 | 47L | 47U | X | | | X | X | X | X | |
| 15-23 | Bullet | | X | | | X | X | X | X | X |

[1] Bit-1 added for upper case symbols only.

TABLE 2

| Key Number | Lower case symbol | Upper case symbol[1] | Assigned code Bit-0 | -1[1] | -2 | -3 | -4 | -5 | -6 | -7 |
|---|---|---|---|---|---|---|---|---|---|---|
| 15-24 | @ | = | X | | X | | | | | |
| 15-25 | * | — | X | | X | | | | | X |
| 15-26 | s | S | X | | X | | | | X | |
| 15-27 | t | T | X | | X | | | | X | X |
| 15-28 | u | U | X | | X | | | X | | |
| 15-29 | v | V | X | | X | | | X | | X |
| 15-30 | w | W | X | | X | | | X | X | |
| 15-31 | x | X | X | | X | | | X | X | X |
| 15-32 | y | Y | X | | X | | X | | | |
| 15-33 | z | Z | X | | X | | X | | | X |
| 16-32 | 32L | 32U | X | | X | | X | | X | |
| 16-36 | 36L | 36U | X | | X | | X | | X | X |
| 16-40 | 40L | 40U | X | | X | | X | X | | |
| 16-44 | 44L | 44U | X | | X | | X | X | | X |
| 16-48 | 48L | 48U | X | | X | | X | X | X | |
| 15-34 | Comma | | X | | X | | X | X | X | X |
| 15-35 | 0 | ) | X | | X | X | | | | |
| 15-36 | 1 | ! | X | | X | X | | | | X |
| 15-37 | 2 | " | X | | X | X | | | X | |
| 15-38 | 3 | # | X | | X | X | | | X | X |
| 15-39 | 4 | $ | X | | X | X | | X | | |
| 15-40 | 5 | % | X | | X | X | | X | | X |
| 15-41 | 6 | & | X | | X | X | | X | X | |
| 15-42 | 7 | § | X | | X | X | | X | X | X |
| 15-43 | 8 | ' | X | | X | X | X | | | |
| 15-44 | 9 | ( | X | | X | X | X | | | X |
| 16-33 | 33L | 33U | X | | X | X | X | | X | |
| 16-37 | 37L | 37U | X | | X | X | X | | X | X |
| 16-41 | 41L | 41U | X | | X | X | X | X | | |
| 16-45 | 45L | 45U | X | | X | X | X | X | | X |
| 16-49 | 49L | 49U | X | | X | X | X | X | X | |
| 15-45 | Period | | X | | X | X | X | X | X | X |

[1] Bit-1 added for upper case symbols only.

TABLE 3

| Key Number | Lower case symbol | Upper case symbol[1] | Assigned code Bit-0 | -1 | -2[1] | -3 | -4 | -5 | -6 | -7 |
|---|---|---|---|---|---|---|---|---|---|---|
| 16-0 | 0L | 0U | | X | | | | | | |
| 16-1 | 1L | 1U | | X | | | | | | X |
| 16-2 | 2L | 2U | | X | | | | | X | |
| 16-3 | 3L | 3U | | X | | | | | X | X |
| 16-4 | 4L | 4U | | X | | | | X | | |
| 16-5 | 5L | 5U | | X | | | | X | | X |
| 16-6 | 6L | 6U | | X | | | | X | X | |
| 16-7 | 7L | 7U | | X | | | | X | X | X |
| 16-8 | 8L | 8U | | X | | | X | | | |
| 16-9 | 9L | 9U | | X | | | X | | | X |
| 16-10 | 10L | 10U | | X | | | X | | X | |
| 16-11 | 11L | 11U | | X | | | X | | X | X |
| 16-12 | 12L | 12U | | X | | | X | X | | |
| 16-13 | 13L | 13U | | X | | | X | X | | X |
| 16-14 | 14L | 14U | | X | | | X | X | X | |
| 16-15 | 15L | 15U | | X | | | X | X | X | X |
| 16-16 | 16L | 16U | | X | | X | | | | |
| 16-17 | 17L | 17U | | X | | X | | | | X |
| 16-18 | 18L | 18U | | X | | X | | | X | |
| 16-19 | 19L | 19U | | X | | X | | | X | X |
| 16-20 | 20L | 20U | | X | | X | | X | | |
| 16-21 | 21L | 21U | | X | | X | | X | | X |
| 16-22 | 22L | 22U | | X | | X | | X | X | |
| 16-23 | 23L | 23U | | X | | X | | X | X | X |
| 16-24 | 24L | 24U | | X | | X | X | | | |
| 16-25 | 25L | 25U | | X | | X | X | | | X |
| 16-26 | 26L | 26U | | X | | X | X | | X | |
| 16-27 | 27L | 27U | | X | | X | X | | X | X |
| 16-28 | 28L | 28U | | X | | X | X | X | | |
| 16-29 | 29L | 29U | | X | | X | X | X | | X |
| 16-30 | 30L | 30U | | X | | X | X | X | X | |
| 16-31 | 31L | 31U | | X | | X | X | X | X | X |

[1] Bit-2 added for upper case symbols only.

The key 16–0 represents a designated variant in each such set. This variable identity system is accomplished by operation of a particular key of command keyboard 17 of function section 12 prior to operation of keys of keyboard 16.

Function section 12 comprises three keyboards: command keyboard 17, size keyboard 26 and instruction keyboard 27. The command keyboard preferably comprises sixteen keys, identified as 17–0 through command 17–15 in Table 4. The size keyboard includes sixteen keys identified as 26–0 through 26–15 in Table 4. The instruction keyboard has thirty-two keys, identified as 27–1 through 27–32 in Table 5. Each of the function keys is shown in Tables 4 and 5 to have a particular eight-bit code, and each such key has a single meaning. This is in contrast to the keys of the character keyboards which represent upper case and lower case symbols.

The particular eight-bit code assigned in Tables 1 through 5 is merely representative, it being understood that any suitable eight-bit code may be selected for the practice of the invention. Each of Tables 1 through 5 contains 32 entries, the codes for which are distinguished from other codes in the same table by the use of the last five bits, bit-3 through bit-7 ($2^5$).

FUNCTION KEYBOARDS.—TABLE 4

| Key Number | Symbol | Assigned code | | | | | | | |
|---|---|---|---|---|---|---|---|---|---|
| | | bit-0 | -1 | -2 | -3 | -4 | -5 | -6 | -7 |
| 26-0 | Size 0 | | | X | | | | | |
| 26-1 | Size 1 | | | X | | | | | X |
| 26-2 | Size 2 | | | X | | | | X | |
| 26-3 | Size 3 | | | X | | | | X | X |
| 26-4 | Size 4 | | | X | | | X | | |
| 26-5 | Size 5 | | | X | | | X | | X |
| 26-6 | Size 6 | | | X | | | X | X | |
| 26-7 | Size 7 | | | X | | | X | X | X |
| 26-8 | Size 8 | | | X | | X | | | |
| 26-9 | Size 9 | | | X | | X | | | X |
| 26-10 | Size 10 | | | X | | X | | X | |
| 26-11 | Size 11 | | | X | | X | | X | X |
| 26-12 | Size 12 | | | X | | X | X | | |
| 26-13 | Size 13 | | | X | | X | X | | X |
| 26-14 | Size 14 | | | X | | X | X | X | |
| 26-15 | Size 15 | | | X | | X | X | X | X |
| 17-0 | Command 0 | | | X | X | | | | |
| 17-1 | Command 1 | | | X | X | | | | X |
| 17-2 | Command 2 | | | X | X | | | X | |
| 17-3 | Command 3 | | | X | X | | | X | X |
| 17-4 | Command 4 | | | X | X | | X | | |
| 17-5 | Command 5 | | | X | X | | X | | X |
| 17-6 | Command 6 | | | X | X | | X | X | |
| 17-7 | Command 7 | | | X | X | | X | X | X |
| 17-8 | Command 8 | | | X | X | X | | | |
| 17-9 | Command 9 | | | X | X | X | | | X |
| 17-10 | Command 10 | | | X | X | X | | X | |
| 17-11 | Command 11 | | | X | X | X | | X | X |
| 17-12 | Command 12 | | | X | X | X | X | | |
| 17-13 | Command 13 | | | X | X | X | X | | X |
| 17-14 | Command 14 | | | X | X | X | X | X | |
| 17-15 | Command 15 | | | X | X | X | X | X | X |

TABLE 5

| Key Number | Symbol | Assigned code | | | | | | | |
|---|---|---|---|---|---|---|---|---|---|
| | | bit-0 | -1 | -2 | -3 | -4 | -5 | -6 | -7 |
| 27-32 | Inst 32 | | | | | | | | |
| 27-1 | Inst 1 | | | | | | | | X |
| 27-2 | Inst 2 | | | | | | | X | |
| 27-3 | Inst 3 | | | | | | | X | X |
| 27-4 | Inst 4 | | | | | | X | | |
| 27-5 | Inst 5 | | | | | | X | | X |
| 27-6 | Inst 6 | | | | | | X | X | |
| 27-7 | Inst 7 | | | | | | X | X | X |
| 27-8 | Inst 8 | | | | | X | | | |
| 27-9 | Inst 9 | | | | | X | | | X |
| 27-10 | Inst 10 | | | | | X | | X | |
| 27-11 | Inst 11 | | | | | X | | X | X |
| 27-12 | Inst 12 | | | | | X | X | | |
| 27-13 | Inst 13 | | | | | X | X | | X |
| 27-14 | Inst 14 | | | | | X | X | X | |
| 27-15 | Inst 15 | | | | | X | X | X | X |
| 27-16 | Inst 16 | | | | X | | | | |
| 27-17 | Inst 17 | | | | X | | | | X |
| 27-18 | Inst 18 | | | | X | | | X | |
| 27-19 | Inst 19 | | | | X | | | X | X |
| 27-20 | Inst 20 | | | | X | | X | | |
| 27-21 | Inst 21 | | | | X | | X | | X |
| 27-22 | Inst 22 | | | | X | | X | X | |
| 27-23 | Inst 23 | | | | X | | X | X | X |
| 27-24 | Inst 24 | | | | X | X | | | |
| 27-25 | Inst 25 | | | | X | X | | | X |
| 27-26 | Inst 26 | | | | X | X | | X | |
| 27-27 | Inst 27 | | | | X | X | | X | X |
| 27-28 | Inst 28 | | | | X | X | X | | |
| 27-29 | Inst 29 | | | | X | X | X | | X |
| 27-30 | Inst 30 | | | | X | X | X | X | |
| 27-31 | Inst 31 | | | | X | X | X | X | X |

The remaining bits, bits-0 through -2, serve to distinguish the entries in one table from entries in other tables having similar codes in bits-3 through -7. By reason of the arrangement of entries in the tables, bits-0 through -3 serve further to distinguish qualitatively among character, size, command and instruction entries.

Returning to FIG. 3, signal generator 13 comprises output terminals 28 through 45 at which pulses may be generated in response to keyboard entries. Operation of a character key will cause the generator to yield pulses at certain of the terminals 28 through 35, these terminals corresponding to the character (C) code bits, bit-0 through bit-7. A STROBE (C) signal will always appear at terminal 37 upon operation of a character key. Generator 13 will provide a pulse at terminal 38 whenever the upper case (UC) keys 20 or 25 are operated. Generator 13 will yield a pulse at terminal 36 upon the operation of a GAP key (not shown) on the character kepboard, thereby initiating a silent recording period to separate keyboard entries. A STROBE (F) pulse will always appear at terminal 39 upon operation of a function key. Operation of a function key will also cause the generator to yield pulses at certain of the terminals 40–45, these terminals corresponding to function (F) bits, bit-3 through bit-7 and bit-2.

Encoder 22 has input terminals 46 through 57 to which are connected the pulses generated by signal generator 13. At terminals 46 through 48 the character bits, bit-0 through bit-2 (C) are applied to the encoder. At terminals 49 through 53, the character bits, bit-3 through bit-7 (C) and the function bits, bit-3 through bit-7 (F), are collected. At terminal 54 the GAP (C) signal is applied to the encoder. At terminal 55 the STROBE signals from both the character and function keyboards are collected. At terminal 56 the upper case (UC) signal is applied to the encoder and at terminal 57 the encoder receives the function bit, bit-2 (F). The encoder further comprises output terminals 58 through 67, terminals 58 through 65 providing the data bits, (D), bit-0 through bit-7, which are applied to recorder input terminals 68 through 75. At encoder output terminal 66, the RECORD signal is generated and applied to recorder input terminal 76. The GAP (R) signal generated at terminal 67 of the encoder is applied to terminal 77 of the recorder.

Figure 4:
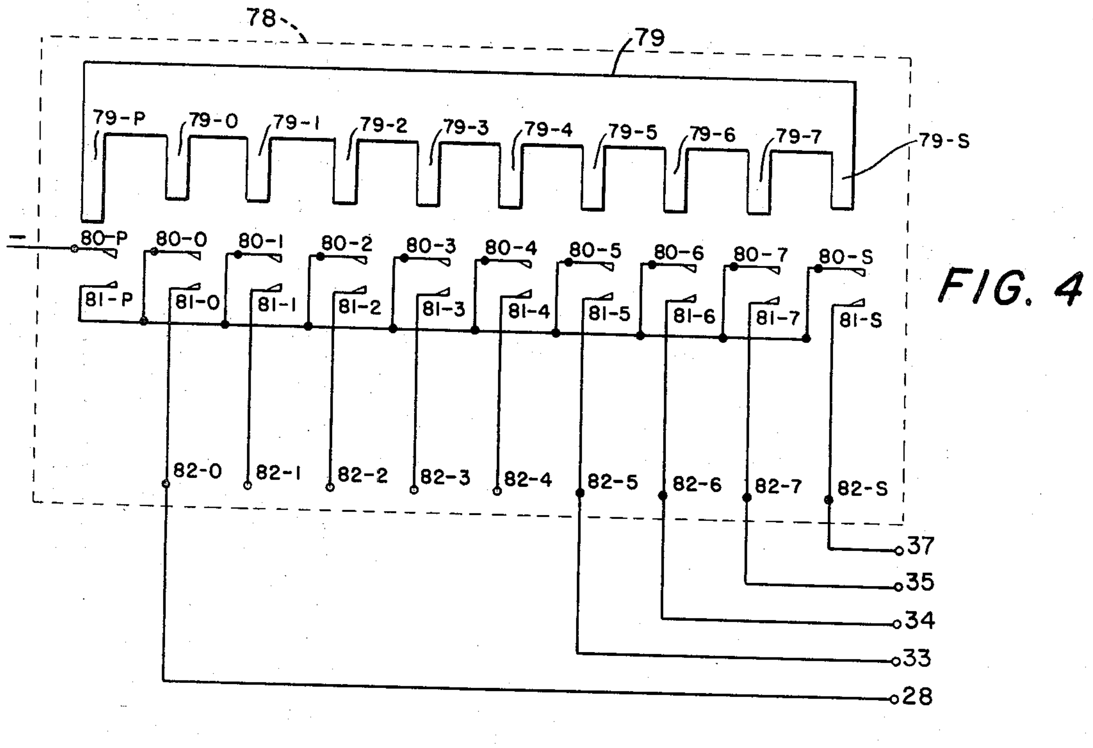
FIG. 4 is a schematic representation of a portion of the signal generator of FIG. 3.

In FIG. 4 there is illustrated an embodiment of a switch assembly which may be employed in signal generator 13. The switch assembly is identical in all respects to the switch assembly associated with all keys employed in the system except that upper case and GAP keys which may be simple single pole switches. All code differentiations for characters and functions are accomplished by differences in the external connections between each switch assembly and the generator output terminals.

The particular switch assembly 78 is associated with the character key 15–7 representing the symbols *g* and G and is shown in FIG. 4 with external connections to the signal generator output terminals. Switch assembly 78 comprises an actuator 79 connected to the key, actuator 79 having a series of ten lugs 79–0 through 79–7, 79–P and 79–S extending downwardly therefrom. Disposed in the path of lugs 79 are a series of movable upper contacts 80–0 through 80–7, 80–P and 80–S, and fixed lower contacts 81–0 through 81–7, 81–P and 81–S. Upper contact 80–P is connected to a power supply of negative voltage. Lower contact 81–P is connected to all remaining upper contacts. All remaining lower contacts are connected to switch assembly output terminals 82–0 through 82–7 and 82–S.

As the key is operated, actuator 79 closes all contacts, contacts 80–P and 81–P somewhat earlier and contacts 80–S and 81–S somewhat later than the remaining contacts by virtue of the differences in the lengths of the lugs of actuator 79. Lug 79–P is longer than lugs 79–0 through 79–7, which in turn are longer than lug 79–S. As a result, power is applied to the upper contacts before the upper contacts are actually displaced, and negative pulses are established at output terminals 82–0 through 82–7 before the negative pulse at output terminal 82–S is established. Thus, the eight-bit code is generated prior to the indication to the encoder (STROBE pulse) that the pulses are available for encoding. Since the code assigned to the key representing symbols *g*, G (Table 1) is a negative pulse (FALSE) in bits 0, 5, 6 and 7, electrical connections are made only between switch assembly output terminals 82–0, 82–5, 82–6 and 82–7 and signal generator output terminals 28, 33, 34 and 35, respectively, as is shown in FIG. 4. The STROBE output terminal 82–S of each switch is connected to signal generator output terminal 37.

Similarly all other signal generator switch assemblies have electrical connections made between the switch assembly output terminals 82–0 through 82–7 and generator output terminals 28 through 35, according to the assigned code.

Like connections are made from the output terminals of the switch assemblies associated with the keys of the function keyboards to the output terminals 39 through 45 of generator 13. In the case of these switch assemblies, output terminals 82–0 and 82–1 are not employed since, as may be seen in Tables 4 and 5, the function keyboard keys all have codes which do not contain entries in bit-0 or bit-1. Since, in the particular eight-bit code described in the tables, the codes for function keys are distinguished from character codes on the basis of bit-0 (C), bit-1 (C), bit-2 (C) and bit-2 (F), output terminals 28, 29, 30 and 45 of signal generator 13 are connected separately to the encoder. The remaining five bits of the code serve only to distinguish among the thirty-two keys in each table. Thus, they are connected to the encoder jointly, i.e., bit-3 $(C+F)$, bit-4 $(C+F)$, etc., by interconnecting signal generator output terminals 31 and 40, 32 and 41, etc., since the encoder is unaffected by the origination of such information in either the character or function keyboard.

Signal generator 13 also contains single pole switches (not shown) actuated by the upper case (UC) key 20, 25. The output terminal of each switch is connected to generator output terminal 38 to provide negative pulse to the encoder.

Figure 5:
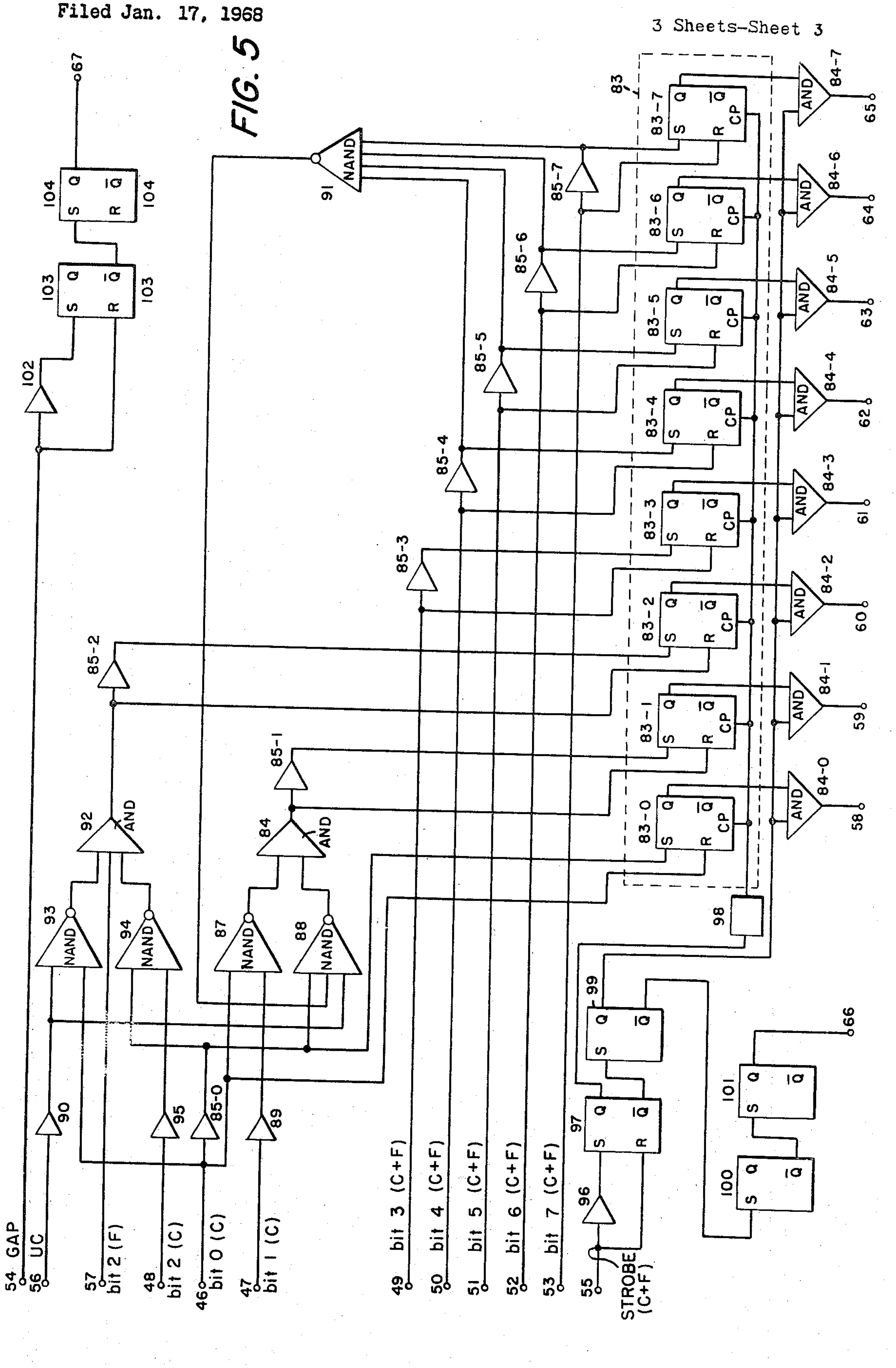
FIG. 5 is a schematic representation of the encoder of FIG. 3.

The encoder is shown in detail in FIG. 5. The central element in the encoder is an eight-bit data register 83 comprising flip-flops 83–0 through 83–7. The flip-flops have set (S) and reset (R) inputs and have two output terminals Q and $\overline{Q}$. The flip-flops are caused to change state depending upon the input signal when a clock pulse is applied to terminals CP. When a positive signal (TRUE) is applied to the set terminal (S), the clock pulse sets the flip-flop such that the Q output terminal is TRUE. When a TRUE gate is applied to the reset terminal (R), the flip-flop is reset such that terminal Q yields a FALSE signal. The Q output terminals of flip-flops 83–0 through 83–7 are applied to AND gates 84–0 through 84–7, and upon the occurrence of a gating signal at the remaining input to these AND gates, the register contents are made available at encoder output terminals 58 through 65. The encoder has two additional output terminals, 66 and 67. A negative signal at terminal 66 constitutes a RECORD signal upon the occurrence of which recorder 14 (FIG. 3) records the data present on terminals 58 through 65. A negative signal at terminal 67 constitutes a GAP signal upon the occurrence of which the recorder will advance a set increment without recording any data during the period.

The state of the flip-flops of data register 83 is controlled by inverters 85–0 through 85–7, the reset and set terminals of each flip-flop being connected respectively to the input and output terminals of each inverter. The inverters 85–0 and 85–3 through 85–7 are controlled directly by signals appearing at encoder input terminals 46 and 49 through 53. In the case of the inverters 85–1 and 85–2, encoder input signals are processed by logic circuits prior to application to these inverters. Inverter 85–1 derives its input signal from AND gate 86 which is in turn dependent upon the outputs of NAND gates 87 and 88. Gate 87 has input signals derived from encoder input terminal 46 and from inverter 89, the input of which is connected to encoder input terminal 47. Gate 88 has inputs derived from inverter 85–0, inverter 90 and NAND gate 91. Inverter 85–2 is controlled by AND gate 92 which derives its input signals from NAND gates 93 and 94 and from encoder input terminal 57. Gate 93 derives one input signal from inverter 90 which is connected to encoder input terminal 56 and a second input signal from encoder input terminal 46. Gate 94 is controlled by inverter 85–0 and by inverter 95, the input to which is derived from encoder input terminals 48.

The signal adapted to gate information to the recorder and to control recorder operation is derived from encoder input terminal 55. This signal (STROBE) is applied to both inverter 96 and the reset terminal of flip-flop 97. The set terminal of flip-flop 97 is connected to the output of inverter 96. Upon the occurrence of a STROBE signal, flip-flop 97 is set TRUE and the positive signal at output terminal Q thereof is applied to driver-differentiator 98 to supply clock pulses to data register 83. The $\overline{Q}$ output terminal of flip-flop 97 is connected to the set terminal of monostable multivibrator 99, and since multivibrator 99 triggers on the leading edge of the set signal, it is set TRUE sometime after the generation of the clock pulses. Upon this change in state of multivibrator 99, a TRUE signal is conducted to AND gates 84–0 through 84–7 to gate the contents of the register through to the encoder output terminals. Monostable multivibrator 99 remains in the set condition for 25 microseconds after triggering. Multivibrator 100 has the set terminal thereof connected to the $\overline{Q}$ terminal of multivibrator 99 and is triggered by the leading edge of the output pulse, which occurs at the end of the 25 microsecond period. Monostable multivibrator 100 has a period of 5 microseconds and its output is used to trigger monostable multivibrator 101 which has a period of 15 microseconds. Output terminal Q of monostable multivibrator 101 provides the RECORD signal at encoder output terminal 66.

The encoder input terminal 54 is connected both to inverter 102 and to the reset terminal of flip-flop 103. The set terminal of flip-flop 103 is connected to the output of inverter 102 whereby the flip-flop is set TRUE upon the occurrence of the GAP signal at terminal 54. The output terminal of flip-flop 103 is connected to trigger monostable multivibrator 104 which has a period of 150 microseconds. Thus a GAP (R) pulse is made available at encoder output terminal 67 to advance the tape recorder during which period the encoder is silent.

The operation of the encoder will be evident from a detailed description of encoder activity following operator selection of keys in each of the Table 1 through 5. In its data processing function, the encoder employs both AND and NAND logic gates. An AND gate, for example, gate 86, will yield a TRUE output only when both inputs to the gate, namely the outputs of gates 87 and 88, are TRUE. Under all other input conditions, an AND gate provides a FALSE output. In the case of the NAND gate, for example, gate 87, the gate will yield a FALSE output only when both inputs, namely, the output of inverter 89 and the signal at encoder input terminal 46, are TRUE. Under all other conditions, the output of a NAND gate is TRUE. The inverters, for example, inverter 90, simply perform an inversion of the input signal. Thus, when the UC signal is present at terminal 56, the input to inverter 90 is negative or FALSE and inverter 90 will yield a positive or TRUE output signal.

(1) ENTRY OF CHARACTERS REPRESENTED BY KEYS OF FIRST CHARACTER KEYBOARD 15

(a) Operator selection of key 15–7 (Table 1)

Table 1 indicates the code bits 0, 5, 6 and 7, assigned to key 15–7, which represents the symbols *g* and G. When the key is operated, negative or FALSE signals will be produced by generator 13 encoder input terminals 46, 51, 52 and 53. Terminal 55 will also go FALSE since a STROBE pulse will occur. All encoder input terminals will be TRUE. Since the inputs to inverters 85–5, 85–6 and 85–7 are FALSE, a FALSE signal is supplied to the reset terminals of flip-flops 83–5, 83–6 and 83–7. The set terminals of these flip-flops received TRUE signals from the outputs of the inverters and these flip-flops are therefore set TRUE. Flip-flop 83–0 is set TRUE by similar action of inverter 85–0. Since the inputs to inverters 85–3 and 85–4 are TRUE at this time, the reset terminals of flip-flops 83–3 and 83–4 receive TRUE signals, setting both flip-flops to the FALSE state. Flip-flop 83–1 is also set FALSE since the input to inverter 85–1 is TRUE as a result of both inputs to AND gate 86 being TRUE. The AND gate 86 input derived from NAND gate 87 is TRUE because an input to NAND gate 87 is not TRUE, the TRUE signal from terminal 47 being rendered FALSE by generator 89. The AND gate 86 input derived from NAND gate 88 is similarly TRUE since an input thereto is not TRUE, the TRUE (UC) signal at terminal 56 being rendered FALSE by inverter 90.

Flip-flop 83–2 is also maintained FALSE at this time since the input to inverter 85–2 is TRUE. This condition exists by reason of the fact that all inputs to AND gate 92 are TRUE. The input to AND gate 92 derived from NAND gate 93 is TRUE since both inputs to the NAND gate 93 are not TRUE, the 0 (C) signal at terminal 46 being FALSE and the (UC) signal at terminal 56 inverted by inverter 90 also being FALSE. The input to gate 92 derived from encoder input terminal 57 is also TRUE. The input to gate 92 derived from NAND gate 94 is TRUE since an input to NAND gate 94 is not TRUE, the 2 (C) signal at terminal 48 being inverted by inverter 95 to FALSE.

By virtue of the conditions existing in the encoder logic at this time, the data register 83 will be set to the code corresponding to the character *g* upon the occurrence of clock pulses at the output of driver 98. This data will subsequently be gated through gates 84 to the encoder output terminals for recordation.

If the command to the encoder had been the symbol G instead of *g*, in which case the upper case key 20 is operated with key 15–7, the above conditions would exist except that the encoder input terminal 56 would also receive a negative pulse from the signal generator. As a result, all inputs to NAND gate 88 will now be TRUE and the gate will yield a FALSE output signal. AND gate 86, now having other than all TRUE inputs, will yield a FALSE output signal to the reset terminal of flip-flop 83–1 and inverter 85–1. The output of inverter 85–1 will now be TRUE, setting flip-flop 83–1 to the TRUE state. Thus, the encoder operates in this case to insert bit–1 into the code for the symbol *g* to create a new code for the symbol G. In like manner, all upper case symbols in Table 1 (and also in Table 2) are distinguished by the addition of bit–1 from the corresponding lower case symbols.

Exceptions are made to this rule for those character keys which have the same upper and lower case designation, namely, the space key 15–11, the bullet key 15–23, the comma key 15–34 and the period key 15–45. During the operation of these keys, concurrent operation of the upper case key 20 will not result in the setting of flip-flop 83–1 TRUE by reason of the inhibiting action of NAND gate 91, as will now be explained. The codes assigned to keys 15–11, 15–23, 15–34 and 15–45 contain entries in code bits 4 through 7. NAND gate 91 senses this condition since all inputs to gate 91 are TRUE when these keys are operated. Under these conditions, NAND gate 91 yields a FALSE output which inhibits the insertion of a bit in flip-flop 83–1. This inhibiting occurs since the input to NAND gate 88 derived from gate 91 now becomes FALSE and flip-flop 83–1 sees the same TRUE output from AND gate 86 that it sees during normal lower case character designation notwithstanding that the upper case key is also operated.

(b) Operator selection of key 15–31 (Table 2)

The code assigned to this key which represents the symbols *x* and X, contains entries in bit positions 0, 2, 5, 6 and 7. FALSE signals are thus generated at encoder input terminals 46, 48, 51, 52 and 53 and it is desired to set only data register flip-flops 83–0, 83–2, 83–5, 83–6 and 83–7 TRUE. The flips-flops 83–6, 83–5, 83–6 and 83–7 are set TRUE by their associated inverters as in the case of the above example. The flip-flop 83–2 is set TRUE since the output of AND gate 92 is now FALSE. This condition exists since the output of NAND gate 94, which provides an input to AND gate 92, is FALSE. This results since both inputs to NAND gate 94 are TRUE, the signal at the terminal 46 being inverted to TRUE by inverter 85–0 and the signal at terminal 48 being inverted to TRUE by inverter 95. Since the FALSE signal appearing at input terminal 48, which signal is common to all characters in Table 2, and distinguishes them from those of Table 1, has no effect upon the logic circuits associated with flip-flop 83–1, this flip-flop remains in the FALSE state as was the case for the Table 1 entry except when an upper case selection is made.

In the case of the selection of the upper case symbol, X, TRUE conditions occur at NAND gate 88 input terminals and bit–1 is inserted in the code for the symbol *x* by the setting of flip-flop 83–1 TRUE.

(2) ENTRY OF CHARACTERS REPRESENTED BY KEYS OF SECOND CHARACTER KEYBOARD 16 IN TABLE 3

The entries in Table 3, constituting the variable identity characters, represented by keys 16–0 through 16–31 have in common an entry in bit position as part of their codes and the utilization of bit–2 to signify the upper case symbol.

The code for the key 16–7 includes in addition bits in the positions 5 through 7. Upon operation of this key, selecting symbol 16–7L the encoder input terminals 47, 51, 52 and 53 go FALSE and it is desired to set only data register flip-flops 83–1, 83–5, 83–6 and 83–7 TRUE. Flip-flops 83–5, 83–6 and 83–7 are set TRUE by their associated inverters. Flip-flops 83–0, 83–3 and 83–4 are similarly set FALSE by their inverters. Flip-flop 83–1 is set TRUE since the input to inverter 85–1 is FALSE at this time. The NAND gate 87 input to AND gate 86 is FALSE as a result of both inputs to NAND gate 87 being TRUE. One input to gate 87 is TRUE since the encoder input terminal 46 is TRUE. The remaining input to gate 87 is TRUE, being derived from inverter 89 which inverts the FALSE signal present at encoder input terminal 47. Flip-flop 83–2 is maintained FALSE during this period since the input to inverter 85–2 is TRUE, all inputs to AND gate 92 being TRUE. The data register 83 therefore will contain the code corresponding to the symbol 16–7L upon the issuance of clock pulses from driver 98.

The encoder functions to insert a bit in flip-flop 83–2 when upper case is called for in connection with Table 3 entries. In this case, the input to inverter 85–2 changes to a FALSE since one of the inputs to AND gate 92 becomes FALSE, namely the output of NAND gate 93. This occurs since both inputs to NAND gate 93 become TRUE when upper case is demanded. The upper input is TRUE since the FALSE signal at encoder input terminal 56 is inverted by inverter 90. The remaining input to gate 93 is derived from encoder input terminal 46 which at this time is TRUE. It should be noted that NAND gate 91, which inhibits the insertion of the upper case distinguishing bit (bit–1) in connection with certain Table 1 and Table 2 characters, has no effect upon the insertion of the upper case distinguishing bit (bit–2) for Table 3 entries. Thus, the bit–2 insertion occurs even for the keys 16–15 and 16–31 although they generate bits 4 through 7.

(3) ENTRY OF SIZES AND COMMANDS

The codes for the size and command keys (Table 4), have in common an entry in bit position 2. As function keys no upper case symbols are involved. Size and command codes are distinguished from one another by the different entries in bit positions 3 through 7. Since the signals indicating command or size selection originate in the function keyboard, the encoder input signal at terminal 57 will be FALSE during their selection along with one or more of the signals at encoder input terminals 49 through 53.

Upon operator selection of command key 17–2, it is desired to set data register flip-flops 83–2, 83–3 and 83–6 TRUE. Flip-flops 83–3 and 83–6 will be set TRUE by inverters 85–3 and 85–6. In like manner, the flip-flops 83–0, 83–4, 83–5 and 83–7 will be set FALSE. Flip-flop 83–1 will be set FALSE since the input to inverter 85–1 is FALSE during function keyboard operations since one input to AND gate 86 is not TRUE. The NAND gate 88 input to gate 86 is FALSE since the inputs thereto are not all TRUE, the input derived from inverter 85–0 being FALSE and the input derived from inverter 90 being FALSE since encoder input terminals 46 and 56 are always TRUE during function keyboard operations. Flip-flop 83–2 is set TRUE during the selection of key 17–2, as it is by every command and size key, since the input to inverter 85–2 is FALSE. This condition exists since one input to AND gate 92 is FALSE, namely that derived from encoder input terminal 57. The result of this encoder activity is to set the code for key 17–2 into data register flip-flops 83–2, 83–3 and 83–6.

(4) ENTRY OF INSTRUCTIONS

The instruction codes (Table 5) have in common the absence of an entry in bit positions 0, 1 and 2. They are distinguished from one another by the different entries in bit positions 3 through 7. As instruction key 27–7 is operated, the encoder input terminals 51, 52 and 53 go FALSE and inverters 85–5, 85–6 and 85–7 set flip-flops 83–5, 83–6 and 83–7 TRUE. The data register 83 thus contains the proper code for key 27–7. The remaining flip-flops 83–0 through 83–4 are maintained FALSE during the encoding of this instruction. The flop-flops 83–0, 83–3 and 83–4 are set FALSE directly by their associated inverters. Flip-flop 83–1 is FALSE since the input to inverter 85–1 is TRUE both inputs to AND gate 86 being TRUE. The NAND gate 87 input to gate 86 is TRUE since the output of inverter 89 feeding gate 87 is FALSE, the input to inverter 89 being the TRUE signal appearing at encoder input terminal 47. The NAND gate 88 input to gate 86 is TRUE since the inputs thereto derived from inverter 90 and inverter 85–0 are FALSE. The inputs to these inverters from encoder input terminals 56 and 46 are TRUE. Flip-flop 83–2 is maintained FALSE since the input of inverter 85–2 is TRUE, all inputs to AND gate 92 being TRUE at this time. The input derived from NAND gate 93 is TRUE since one of the inputs thereto, that derived from inverter 90, is FALSE. Likewise, the input to the AND gate 92 derived from encoder input terminal 57 is TRUE. NAND gate 94 yields a true output since the inputs thereto derived from inverters 85–0 and 95 are FALSE. The result of this encoder activity is to set the code for the key 27–7 into data register flip-flops 83–5, 83–6 and 83–7.

Data made available at the output terminals 58 through 65 of the encoder may be recorded by any suitable eight-channel recording system. Preferably, the terminals are connected to the pre-amplifiers of such a recorder and are impressed upon a tape or other medium by any suitable data writing means. Magnetic writing heads are particularly adaptable to this invention. The RECORD signal made available at terminal 66 of the encoder may be employed as a gating signal for the pre-amplifier outputs. As mentioned previously, the GAP signal at terminal 67 of the encoder serves to control advance of the recording medium without entry of data such that blocks of data may be separated from one another.

By modification of the read-out circuits of the encoder, the system may operate into a recorder having fewer than eight-channels. In the case of a recorder having from four to seven channels, for example, the data may be read out of the encoder in groups of four bits, AND gates 84–0 through 84–3 being enabled at one time and recorded, AND gates 84–4 through 84–7 are then enabled one recording period thereafter and entered on the tape in the next successive recordation frame. The computer into which the tape is fed will then simply be programmed to read a first and second frame to derive a single data word.

In preparing a record which controls a graphic arts computer-composer, a preparatory step involves the making or encoding of the manuscript to be printed. In this operation, any character appearing in the manuscript represented by a key on the second character keyboard, which is the variable identity keyboard, is marked with the appropriate command designation. If, for example, command key 17–2 is allocated to the graphic arts composer font containing the mathematical symbols, the manuscript marker may mark the manuscript with the notation 17–2 adjacent the first of the mathematical symbols appearing in the text. Should the manuscript contain only mathematical symbols and the standard characters of the fixed identity keyboard 15, no further notation is necessary on the manuscript. If, on the other hand, the text comprises other symbols represented by keys of the variable character keyboard 16, such as chemical symbols (key 17–3) and letters of the Greek alphabet (key 17–1), the marker would mark the first such non-standard character of each different grouping of non-standard characters with the appropriate command designation.

As the operator of the keyboard complex observes the first non-standard character in the marked manuscript during the course of preparing the record, he operates the designated command key. An automatic overlay dispensing system may then position an overlay over the second character keyboard, or the operator may himself manually place the overlay in position. The overlay functions to indicate to the operator the identity of the keys of the second character keyboard selected by operation of the command key. The operator then operates the second character keyboard the key identified by the overlay to be the desired non-standard character. This overlay remains in position over the second character keyboard until a different command notation is observed in the manuscript and the corresponding command key is operated.

In the case of the preparation of a record for a manuscript in which the only non-standard symbols involved are in a single set, e.g. mathematical symbols, the manuscript notation would direct the operator to select the command key, 17–2, and the mathematical symbol overlay remains in position over the second character keyboard throughout the preparation of the record. The operator enters the mathematical symbols directly as they appear by operating the appropriate key indicated by the overlay.

Thus, the system of the invention eliminates the former extensive coding of the manuscript, in which the manuscript marker entered several standard characters preceded and followed by delimiters adjacent each non-standard character to identify the desired character to the operator. Also eliminated are the time consuming multiple key strokes formerly performed by the operator on the standard character keyboard to enter the desired non-standard character. In addition the elimination of delimiters and multiple key strokes to indicate a code for a non-standard character minimizes the probability of recordation error.

Upon operator selection of key 17–2, signal generator 13 and encoder 22 operate, to feed into recorder 14 the eight-bit code indicated in Table 4. The recorder in turn impresses the record, such as for example a magnetic tape, with this code. Thereafter, operation of keys of the variable identity keyboard 16 result in recordations of the codes set forth for keys 16–0 through 16–49 in Tables 1, 2 and 3. Similarly, operation of keys of the fixed identity keyboard 15 will result in recordations of the codes set forth for keys 15–0 through 15–45 in Tables 1 and 2.

The completed record is transferred to a computer controlling graphic arts composing apparatus. The computer is programmed to read recordation frames to determine the identity of each frame individually. For the example given, in which the manuscript contains only standard characters and mathematical symbols, the computer will read the standard characters and detect whether they are lower case or upper case directly from the code appearing in each frame. The computer is further programmed to recognize function recordations. The recordation resulting from operation selection of key 17–2, is interpreted by the computer to indicate that the mathematical symbol font is desired for subsequent variable identity codes entered on the tape. These subsequent recordations of variable identity character codes are then read by the computer as mathematical symbols. If the manuscript contained symbols represented by the second character keyboard other than mathematical symbols, the computer would interpret the functional recordation preceding same and thereafter read these second character keyboard recordations accordingly as Greek letters, chemical symbols, etc.

If desired, additional command keys may be provided to indicate to the computer that the entire character section, both standard keyboard 15 and non-standard keyboard 16, shall have a particular type face. For example, command keys 17–13, 17–14 and 17–15 may be allocated respectively to Roman, boldface or italics type faces. In this situation, the manuscript is accordingly marked when type face is to be changed. For example, if it is desired to print certain portions of the manuscript in boldface, the command key 17–14 designation is entered on the manuscript at the appropriate place. When the operator observes this notation he will operate command key 17–14 and the boldface command code will be entered on the record. All keyboard selections thereafter will be printed in boldface until a different type face key is operated.

The present day computers controlling graphic arts composers have the capacity to perform various rearrangements of raw manuscript entries. Such functions include those of tabulation, alphabetization, etc. These functions are brought into play by operation of the instruction keys, each of which may be assigned to a specific function. If, for example, instruction key 27–16 is assigned to tabulate in a certain manner, the manuscript is so marked at the appropriate place. The message is thereupon recorded upon the tape to indicate to the computer that this tabulation is to occur. The computer is programmed to tabulate the subsequent entries of the operator in accordance with the particular format desired.

Although the invention has been described in its application to the graphic arts field the invention also lends itself to any application requiring keyboard entries of a large number of variables. Examples of such applications are air travel passenger reservation control systems inventory control, etc.

What is claimed is:

1. A system for preparation of a record adapted for use in graphic arts composition computers comprising:
(a) a keyboard complex including
(1) a character section having a fixed identity keyboard, each key of which is representative of a particular alphanumeric character and
(2) a function section having a keyboard, each key of which is representative of a functional element, certain of said keys representing functional elements indicative of printing characteristics;
(b) a signal generator operatively connected to said keyboard complex to generate a distinct electrical signal upon operation of each key in said complex;
(c) a recorder operatively connected to said signal generator to record said signals and prepare an intelligence bearing record, said intelligence comprising:
(1) functional element recordations each indicative of a printing characteristic and
(2) character element recordations each indicative of an alphanumeric character, the printing characteristic of said alphanumeric character being indicated by the last preceding functional element printing characteristic recordation.

2. The system claimed in claim 1 wherein said function section keys are indicative of printing type-faces.

3. The system claimed in claim 1 wherein said function section keys are indicative of printing type-sizes.

4. The system claimed in claim 1 wherein said character section includes further a variable identity keyboard adapted to represent *n* distinct sets of character elements, said variable identity keyboard having a plurality of keys each representative of one character element in each of said *n* sets and wherein said function section keyboard further includes *n* keys, each of said keys being representative of further functional elements constituting commands directing said variable identity keyboard to represent a particular one of said *n* sets, said recorded intelligence comprising further variable identity character element recordations and further functional element recordations, each said variable identity characteristic recordation being rendered indicative of a character element in a particular one of said *n* sets by the last preceding further functional element recordation, the printing characteristic of said indicated character element being indicated by the last preceding functional element printing characteristic recordation.

5. The invention claimed in claim 1 wherein the character elements of each of said *n* sets are visually identified by overlays adapted to be positioned over said variable identity keyboard.

6. The invention claimed in claim 1 wherein said signal generator comprises a plurality of switch assemblies operatively responsive to operation of said keys to provide a distinct pattern of electrical pulses at the generator output for each key in said complex.

7. The invention claimed in claim 4 wherein one of said *n* sets of character elements comprises the characters of a foreign alphabet.

8. The invention claimed in claim 4 wherein one of said *n* sets of character elements comprises scientific symbols.

9. A system for encoding and recording information to prepare a record adapted for use in computers controlling graphic arts composing machines comprising:
(a) a keyboard complex including:
(1) a character section having (A) a first fixed identity keyboard having an upper case key and plurality of character keys, each character key being representative of the lower and upper case symbols of a fixed identity character element, and (B) a second variable identity keyboard adapted to represent *n* sets of character elements each element being distinct from said fixed character elements, said keyboard having a plurality of keys each being representative of one character element in each of said *n* sets, and
(2) a function section having a keyboard with at least *n* keys each of said keys being representative of a functional element, each said functional element constituting a command directing said character section variable identity keyboard to represent one of said *n* sets;
(b) a signal generator operatively connected to said keyboard complex to generate distinct electrical signals upon operation of each key in said complex, said signals including an upper case signal;
(c) an encoder operatively connected to said signal generator and including a circuit energized by said upper case signal to modify the characteristics of signals generated in response to operation of said fixed identity character keys, said encoder providing output signals comprising the signals received from said signal generator and modifications thereof,
(d) a recorder operatively connected to said signal generator to record said signals and prepare an intelligence-bearing record, said intelligence comprising
(1) first keyboard character element recordations, each indicative of a lower case or upper case symbol of one of said fixed identity character elements, (2) functional element recordations each indicative of one of said commands, and (3) second keyboard character element recordations, each indicative of one character element in each of said $n$ sets of character elements, said recordation being rendered indicative of a character element in a particular one of said $n$ sets by the last preceding functional element recordation.

10. The invention claimed in claim 9 wherein said second character keyboard adapted to represent $n$ sets of character elements includes an upper case key and a plurality of character keys, each character key being representative of the lower and upper case symbols of one character element in each of said $n$ sets, said encoder including a second circuit energized by said upper case signal to modify the characteristics of signals generated in response to operation of said second keyboard character keys, second keyboard character element recordations being independently indicative of a lower case or upper case symbol of one character element in each of said $n$ sets of character elements, said recordation being rendered indicative of a character element in a particular one of said $n$ sets by the last preceding functional element recordation.

11. The invention claimed in claim 9 wherein said function section keyboard further includes a plurality of keys representing different character print type-faces, operation of said keys resulting in function keyboard recordations indicative of said type-faces, each recordation directing said first and second keyboard character element recordations to be printed in a particular type-face.

12. The invention claimed in claim 9 wherein said function section of said keyboard complex includes further a second keyboard having a plurality of keys representing different character print sizes, operation of said keys resulting in function keyboard recordations indicative of said character print sizes, each recordation directing said first and second keyboard character element recordations to be printed in a particular size.

13. The invention claimed in claim 9 wherein said function section of said keyboard complex includes further a third keyboard having a plurality of keys representing different printing instructions, operation of said keys resulting in function keyboard recordations indicative of said printing instructions.

References Cited

UNITED STATES PATENTS

| | | | |
|---|---|---|---|
| 3,187,321 | 1/1965 | Kameny | 178—17 |
| 3,394,368 | 7/1968 | Carr et al. | 340—365 |

THOMAS A. ROBINSON, Primary Examiner

U.S. Cl. X.R.

95—4.5; 178—79; 235—145; 340—365